US009634841B2

(12) United States Patent
De Los Santos et al.

(10) Patent No.: US 9,634,841 B2
(45) Date of Patent: Apr. 25, 2017

(54) COMPUTER IMPLEMENTED METHOD AND A COMPUTER SYSTEM TO PREVENT SECURITY PROBLEMS IN THE USE OF DIGITAL CERTIFICATES IN CODE SIGNING AND A COMPUTER PROGRAM PRODUCT THEREOF

(71) Applicant: TELEFONICA DIGITAL ESPANA, S.L.U., Madrid (ES)

(72) Inventors: Sergio De Los Santos, Madrid (ES); David Barroso Berrueta, Madrid (ES); Antonio Guzman Sacristan, Madrid (ES); Tero De La Rosa, Madrid (ES); Jose Maria Alonso Cebrian, Madrid (ES)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 0 days.

(21) Appl. No.: 14/559,379

(22) Filed: Dec. 3, 2014

(65) Prior Publication Data
US 2015/0156024 A1 Jun. 4, 2015

(30) Foreign Application Priority Data
Dec. 4, 2013 (EP) .................................... 13382493

(51) Int. Cl.
*H04L 9/32* (2006.01)
*H04L 29/06* (2006.01)
*G06F 21/64* (2013.01)

(52) U.S. Cl.
CPC .......... *H04L 9/3247* (2013.01); *G06F 21/645* (2013.01); *H04L 9/321* (2013.01);
(Continued)

(58) Field of Classification Search
CPC ... H04L 9/3247; H04L 9/3228; H04L 9/3265; H04L 9/3268; H04L 63/123; H04L 63/126; H04L 9/321; H04L 63/067; G06F 21/645
See application file for complete search history.

(56) References Cited

U.S. PATENT DOCUMENTS 5,638,446 A   6/1997 Rubin
5,958,051 A * 9/1999 Renaud ................... G06F 21/64
                                                       726/22
(Continued)

FOREIGN PATENT DOCUMENTS

WO   01/41360 A2    6/2001
WO   2004/004855 A1 1/2004

OTHER PUBLICATIONS

Extended European Search Report of EP 13382493.8 dated May 13, 2014.

*Primary Examiner* — Joseph P Hirl
*Assistant Examiner* — J. Brant Murphy
(74) *Attorney, Agent, or Firm* — Sughrue Mion, PLLC

(57) ABSTRACT

A computer implemented method including a software distributor signing via a first server at least one software file using a digital certificate with a digital signature and at least one user via a computing device acquiring a copy of the signed software file. The digital certificate to be used is previously recorded in a second server in communication with the first server, the digital certificate to be recorded being provided by the software distributor upon a registration of the latter in the second server and including information obtained from a trust certificate chain associated to the digital certificate when performing the registration. The second server generates, upon a request made by the software distributor, a hashstamp of the signed software file.

13 Claims, 7 Drawing Sheets

US 9,634,841 B2
Page 2

(52) U.S. Cl.
CPC .......... *H04L 9/3228* (2013.01); *H04L 9/3265* (2013.01); *H04L 9/3268* (2013.01); *H04L 63/067* (2013.01); *H04L 63/123* (2013.01); *H04L 63/126* (2013.01)

(56) References Cited

U.S. PATENT DOCUMENTS

| | | | |
|---|---|---|---|
| 7,370,206 B1 | 5/2008 | Goldman | |
| 8,745,616 B1* | 6/2014 | Deacon | H04L 63/12 713/158 |
| 2003/0099353 A1* | 5/2003 | Goh | G06Q 20/389 380/51 |
| 2004/0237031 A1* | 11/2004 | Micali | H04L 9/3247 715/229 |
| 2005/0193204 A1* | 9/2005 | Engberg | H04L 9/3247 713/175 |
| 2006/0107035 A1* | 5/2006 | Tamas | H04L 63/0823 713/150 |
| 2007/0118732 A1* | 5/2007 | Whitmore | G06F 21/645 713/155 |
| 2007/0226489 A1* | 9/2007 | Hug | G06F 21/10 713/156 |
| 2008/0046758 A1* | 2/2008 | Cha | G06F 21/57 713/189 |
| 2008/0155691 A1* | 6/2008 | Fossen | G06F 21/562 726/22 |
| 2009/0240936 A1* | 9/2009 | Lambiase | H04L 63/0272 713/156 |
| 2010/0306533 A1* | 12/2010 | Phatak | G06F 21/34 713/156 |
| 2011/0159848 A1* | 6/2011 | Pei | G06F 21/42 455/411 |
| 2014/0040611 A1* | 2/2014 | Tenenboym | H04L 9/3236 713/157 |
| 2014/0040873 A1* | 2/2014 | Goldman | G06F 8/65 717/168 |

* cited by examiner

COMPUTER IMPLEMENTED METHOD AND A COMPUTER SYSTEM TO PREVENT SECURITY PROBLEMS IN THE USE OF DIGITAL CERTIFICATES IN CODE SIGNING AND A COMPUTER PROGRAM PRODUCT THEREOF

FIELD OF THE ART

The present invention is directed, in general, to the field of computer security. In particular the present invention discloses a computer implemented method and a computer system to prevent security problems in the use of digital certificates in code signing and a computer program product thereof.

BACKGROUND OF THE INVENTION

The use of digital signatures to certify the authorship of a software file is a procedure widely adopted by leading companies in development and distribution of software. Adopting digital signatures involves the integration of a complex infrastructure in code development environments and operating systems where this code will be run. Certainly, the use of signed software prevents multiple threats defined for the generation and distribution of software; however, as it also involves the incorporation of new components and services, it is possible to identify new threats that might affect the signature process itself.

The key element of this infrastructure is the use of public key cryptography. It enables designers to maintain signing processes and signature verification processes independently, without the need of a prior exchange of secret keys. The independence of these two processes facilitates the establishment of a classification for categorizing threats according to the process for which they are defined. The theft of certificates (with the compromise or uncontrolled exposure of the associated private key), improper use of certificates, inadequate policies for certificates update and problems in the certification chain (breakage or modification) are the sources of several threats that affect both processes, although the objectives pursued are different whether the signing process or the verifying process is attacked.

Cryptography efficiently responds to the need for extremes identification in any communication process. Different cryptographic mechanisms have been defined to accomplish this task, but the most extended is the use of digital certificates. These are built based on public key cryptography. The task of identifying the extremes is assumed by Certification Authorities (CA), which are in turn identified, by such extremes, as trusted entities. It is necessary that who is behind the public key contained in a given certificate has been identified properly by the certifying authorities. It is also required that a particular certification authority can be identified using its own public key. A correct identification can be accomplished only if these two requirements are satisfied.

Although the digital certificates are crucial in website identification, they are also the key elements in signing processes. Certificate management has to be coherent with an adequate Public Key Infrastructure to provide protocols for implementing the processes related with file signing (code signing). A pair of keys, one public and one private is generated for each user or entity for encryption and decryption. As stated before, to ensure the trustworthiness of public/private keys, certificate authorities (CA) issue digital key certificates. These certificates are signed digitally by de CA to guarantee that an individual providing a digital certificate is who the individual claims to be. By issuing the certificate, a CA is asserting that the content of the certificate applies to the certificated subject. When the certificate subject presents the certificate to relying parties, the relying parties can use digital certificates to authenticate the certificate subject. This certification is valid until the expiration date specified by the CA. If the certificate is not expired, the authentication process typically involves two phases: first, the integrity validation of the certificate using the CA's public key, and second, verifies that the certificate's subject has access to a private key associated with the subject's certificate.

Sometimes, digital certificates may need to be revoked prior to expiry, for example when the privacy of the subject's private password has been compromised. The revoked certificate is then published in a certificate status information database administrated by CA, such as Certificate Revocation List (CRL). When a relying party uses the certificate to authenticate a certificate subject, the relying party may determine the revocation status of the certificate by directly accessing this certificate status information database. However, the CA architecture is a purely centralized solution. High latencies and availability problems occur frequently. In order to eliminate the need for connectivity with the PKI when the relying party need authenticate the certificate subject's identity, one approach allows for each certificate subject to periodically acquire its status from CRL or to obtain an OCSP status for its certificate subject from an OCSP Server. These solutions inherit the availability problems cited above, causing problems with the revocation information actualization [1]. In 2012, Google Inc. proposed to migrate the information contained in the CRL to the browser [2]. This means to leave the traditional centralized schema for a distributed schema, eliminating the bottleneck that the prior OCSP servers or CRL server are being.

Actually, code signing is a particular important application of these digital certificates. Code signing process consists in digitally signing executables and other files that can be interpreted by a runtime platform to ensure that these files have not been altered. Now it is possible to identify a code as coming from a specific source and to determine whether code is trustworthy for a specific purpose (FIG. 1). There are two main methods to code signing: developers/distributors can choose to provide their own self-generated pair of keys (private/public) and they have to provide the public key to the user somehow as disclosed in U.S. Pat. No. 7,370,206; or the public key used to authenticate the code signature should be traceable back to a trusted root authority CA using a secure PKI. Even the second method does not ensure that the code can be trusted; this method only ensures that the code was signed by the subject of the certificate. A CA provides a root trust level and is able to assign trust to others by proxy. If a user trusts a CA, then the user can presumably trust the legitimacy of code that is signed with a key generated by that CA or one of its proxies. Many operating systems and frameworks contain built-in trust for one or more existing CAs. Typically, a code signature consists of three parts:

A file digest, which is a collection of checksums or hashes of the various parts of the code. The digest can be used to detect alterations to the code and to the application identifier.

A digital signature, which is performed by the legitimate user with his or her private key and is used to sign the digest to guarantee its integrity. Therefore, the signature includes information that can be used to determine who signed the code and whether the signature is valid.

A unique identifier, which can be used to identify the code or to determine to which groups or categories the code belongs to.

Like any security measure, code signing can be defeated. Users can be tricked into running unsigned code, or even into running code that refuses to validate. It is also important to note that code signing does not protect the end user from any malicious activity or unintentional software bugs made by the software author [3]. Unfortunately, not even the correct use of software signatures can protect end users. If you cannot ensure that there is no security breach in the whole signing process, it has to be assumed that the resulting software may have been compromised. This means, among other security breaches, that the digital certificates integrity and the signed file integrity can be broken.

The targets wanted by an attacker of a signing software system are:

Cheat the signer to sign a file different than the intended one or under not intended conditions changing the rules or policies established in the signing requirements.

Unauthorized access to the signature creation data.

Replace the signed information. The attacker attempts to replace part or all of the information signed by their own benefit when the file signature has been calculated Make the signed file be attributed to a user different than the actual signer. The attacker seeks that a file signed by certain signer is verified as signed by a different entity. Thereby, the attacker could cause a wrong file's authorship attribution.

Make the signed file attributed to a different user than legitimate user. The attacker seeks that a file signed by the legitimate signer is verified as signed by a different entity. In this way, the attacker could cause the incorrect attribution of authorship of a file.

Make the file to be Verified contents chosen information. The attacker seeks that the signed file is shown to the verifier either with a content which appearance may be different to what was actually signed.

Make the signature verification conclude with an opposite result. The integrity of the signature depends not only on the signature itself but also on the certificate validity.

To reach these targets multiple attack techniques can be documented. A complete classification for them is showed in table 1 formulated in seven different categories [4]:

TABLE 1

Threats defined for the signing process and signature verification processes.

| | | | |
|---|---|---|---|
| Manipulation of the environment of execution of both processes. | Document Modification | Dynamic content inclusion | Hidden Code Active Code Linked Code |
| | | Content Modification | |
| | Attribute Modification | Dynamic Content Inclusion | Hidden Code Active Code Linked Content |
| | | Content Modification | |
| | Data to be signed modification | | |
| | Data to be signed representation Modification | | |
| Modification before the signature calculation. | External Content Cryptanalysis | Hash Function | Collision Attack Pre-Image Attack Second Pre-image attack |
| Modification before the signature calculation. | Compromise of the signer authentication data | Social Engineering | |
| | | Signer Authentication Data Interception | Observation Interception in interprocess/entities communication Endpoint compromise |
| | | Guessing | |
| | Authentication Bypass | | |
| Compromise of the data used in the computation of the signature. | Signature Creation Data Interception | Interception in interprocess/entities communication Endpoint compromise | |
| | Eavesdropping (side-channel) | Timing Analysis Electromagnetic analysis Power analysis Microarchitectural Analysis Optical observation | |
| | Unauthorized access to the Signature Creation Devices | Compromise of the signer authentication Data Authentication Bypass | |
| | Cryptanalysis | Asymmetric Algorithm | |
| | Invasive tampering attacks | | |

TABLE 1-continued

Threats defined for the signing process and signature verification processes.

| | | | |
|---|---|---|---|
| Tampering with the result of the certificates verification. | Alteration of subscriber's revocation request | | |
| | Alteration of certificate status verification | Grace or cautionary period bypassing | Delay in time-stamped signature sending<br>Delay in time-marked signature sending<br>Exploit delay in CA's revocation request processing |
| | | Modification of certificate status verification request<br>Modification of certificate status verification response | Modification of OCSP request<br>Modification of LDAP-based request |
| | | Alteration of time reference verification | Modification of time-stamp<br>Modification of time mark |
| | | Validation information reply<br>Alteration of certificate status verification result | OCSP Response reply |
| | Untrusted trust anchor | | |
| | Alteration of certificate integrity verification result | | |
| | Alteration of certificate validity period verification result | | |
| Tampering with the result of the signature verification. | Presentation Manipulation | Data to be verified masquerading | Document masquerading<br>Attribute masquerading |
| | | Viewer manipulation | Viewer substitution<br>Alteration of viewer's behavior |
| | | Verification result masquerading | |
| | Policy substitution | Electronic signature policy substitution<br>Certificate policy substitution | |
| | Alteration of verification process | Injection of signature-signed data pair<br>Alteration of cryptographic verification result<br>Alteration of final verification result | |

Causing an environment manipulation or achieving a modification before the signature computation an attacker can deceive the signer to sign a document different than the intended one or under unintended conditions. Performing an unauthorized invocation of the signing function or compromising of the signature creation data can suppose an unauthorized use of signature creation data. A modification after signature computation will cause a replacement of signed information. Tampering with certificate verification result or signature verification result can attribute the signed document authority to a different user than the legitimate signer. By other hand, an environment manipulation, joined with an influence on signature verification result, can make that the data to be verified will be shown with maliciously modified content. Finally, tampering with certificate verification result and/or tampering with signature verification result can make the signature validity verification conclude with an opposite result.

In table 1 has been shown that, leaving apart the manipulation of the environment of execution of signing and verifying processes, all the categories contain threats related with security problems derived from the misuse of digital certificates. All these threats are marked in table 1 and can suppose the implementation of different types of attacks: Improper issuance caused by an incorrect CA parsing; incorrect browser parsing of the digital certificates; Man in the Middle attacks; rebinding attacks; abuse of trust anchor information in certification validation paths; Digital Certificate Theft, etc.

Some of the existing solutions for several of these attacks have been described above but there are other solutions that need a deeper analysis. In 2007, the certificate authority industry developed a technology named extended validation certificates (EVC) in order to improve the security in the issuance of certificates. Unlike normal certificates, which indicate only that the owner controls a particular domain name, extended validation certificates also confirm to the identity of a legitimate business. Special mention is needed for the solutions provided to solve the abuse of trust anchor information and the Man in the Middle attacks using a technique called certificate pinning. EMET is a tool developed by Microsoft as a protection software suite which contains solutions for different security problems. One of these solutions provides a technique that proposes to join internet domains with certificates issued by root certificate authorities present in the user's trust certificate store. Another option is provided by Google, who proposes to modify the web browser (i.e. Chrome). Chrome has added to its source code some web sites that will always work with HTTPS active from the beginning. These web sites are called "preloaded HTST sites". In addition of requiring the use SSL protocol from the start of the connection, the Google's browser will remember what public keys are known and it will reject the rest, even if the user doesn't write down https in the browser's address bar. The data of the authorities in which Google usually trusts are included in source code of the browser (VeriSign, Google Internet Authority, Equifax and GeoTrust).

However, the solutions provided to overcome the attacks based on abusing of trust anchor information and the Man in the Middle attacks have several problems that nowadays remain unsolved. Despite they have improved the availability problems related with OCSP and CRL, they have been designed to operate with the web browser by associating web domains to digital certificates and there is noMic opportunity to employ this certificate pining to verify the signature of software files at all. By other hand, the use of extended validation certificates can be compromised by rebinding attacks. Neither the extended validation certificates nor the certificate pinning solutions can do anything to avoid the theft of them.

Digital certificates present in the binaries files of a software product are designed to guarantee the integrity and the authenticity of these files. Several reasons exist to prove why an attacker may need to use illegitimated acquired certificates to sign his own code.

The antivirus solutions usually award higher trust level to files signed by trusted authorities.

The final user (or the victim) trusts the signed files because signature independently of the origin of the certificate used. Also a contributing factor is the fact that verifiers programs are integrated with the operating system user account control to codify with colors the trustiness of a file (e.g. Microsoft UAC): Green color corresponds with a trusted and signed file.

In modern operating systems, correct digital signature is required to perform some tasks, as device driver's installation. If an attacker wants to penetrate in the system in a silent manner, he needs to sign his rootkit with a valid certificate.

Currently, when a stolen certificate is detected, the owner requests its revocation. This revocation implies to publish it in black list but this process presents several inconvenient:

When the theft of the certificate is detected, it is impossible to know for how long this certificate has been in possession of the attacker.

In the case of signing software, the certificate revocation is not always possible because the signed binaries files might not work properly.

There are problems related with delays in the information update from the CRL and OCSP blacklists.

So, there is no solution to defend an end user of signed binaries or software files from the abuse of digital certificates or the compromise of the trust chains associated with them. Therefore, the present invention provides a solution to mitigate the effect of theft certificates and compromised certificate authorities. The invention allows the user verify the integrity of a given file.

REFERENCES

[1] CLARK, Jeremy; VAN OORSCHOT, Paul C. SoK: SSL and HTTPS: Revisiting past challenges and evaluating certificate trust model enhancements. 2012.
[2] TOPALOVIC, Emin, et al. Towards Short-Lived Certificates. Web 2.0 Security and Privacy, 2012.
[3] SENESE, Thomas J.; KRUEGEL, Chris A.; WOODWARD, Timothy G. METHOD AND APPARATUS FOR AUTHENTICATING A DIGITAL CERTIFICATE STATUS AND AUTHORIZATION CREDENTIALS. U.S. Pat. No. 20,130,072,155, 21 Mar. 2013.
[4] HERNÁNDEZ-ARDIETA, Jorge López. Enhancing the reliability of digital signatures as non-repudiation evidence under a holistic threat model. 2011. PhD. Carlos III University of Madrid.

DESCRIPTION OF THE INVENTION

To achieve the above, the present invention provides an infrastructure in which a software distributor who has signed one or more software files (binary executables, etc.) can record all data related to this digital signature. This will determine how certificate signature was made, which software file was signed, at what time this information is published and how the trust certificate chain was at the time of publication. In this way, any user who has acquired a copy of the signed software file and has validated that the digital signature corresponds to a valid digital certificate, now can verify if there are any problems related to the misuse of the digital certificate.

Moreover, a procedure is proposed to allow the final user that has acquired a copy of a signed software file to contrast the data contained in the software file signature with the data stored in the proposed infrastructure by the software distributor and check if there has been any change in the trust certificate chain.

Therefore, in accordance to a first aspect of the present invention it is provided a computer implemented method to prevent security problems in the use of digital certificates in code signing, comprising as commonly in the field: signing, by a software distributor via a first server, at least one software file using a digital certificate with a digital signature identifying said software distributor; and acquiring, by at least one user via a computing device, a copy of said at least one signed software file.

In a characteristic manner and on contrary of the known proposals, the digital certificate to be used for the signing of the software file is previously recorded in a second server in communication with said first server, the digital certificate to be recorded being provided by the software distributor upon a registration of the latter in said second server and the digital certificate including information obtained from a trust certificate chain associated to the digital certificate when performing said registration. Moreover, the second server also generates, upon a request made by the software distributor, a hashstamp of the at least one signed software file.

The registration comprises checking, by the second server, data included in the provided digital certificate including at least a domain and/or an electronic address. Furthermore, the method can also accomplish several verifications in order to certify the relation of a new certificate with an existent software distributor account. For instance, a second authentication of the digital certificate can be performed by the second server by means of: generating a one-time password (OTP); sending, said generated one-time password (OTP) to the software distributor through a communication channel including at least a text message, an electronic message or an instant message; and certifying, upon receiving said OTP from the software distributor, that the received OTP matches with said generated OTP.

Even, before a new certificate is recorded, the second server can check revocation and expiration status of the provided digital certificate and validity of the trust certificate chain. So, in case there is any anomaly an alert system in the second server can notify the software distributor. Specifically, once the trust certificate chain is obtained for the particular digital certificate, the relation between all the intermediate certification authorities is analyzed by means of irregularities search.

According to a first alternative, the software distributor in order to request the generation of said hashstamp can use a dedicated program to extract the digital signature of the signed software file and send it to the second server along with the name of the signed software file.

According to a second alternative, the software distributor to request the generation of the hashstamp can upload the signed software file directly to the second server. In this second alternative, the extraction of information of the digital signature of the software file and the following verification is done by the second server.

The generated hashstamp includes information about the software distributor and about the signed software file and a time record certifying a time at which the signing of the software file is reported to the software distributor.

According to an embodiment, the second server can exploit the information provided by remote sources such as a Certification Authority (CA) or an Online Certificate Status Protocol (OCSP) to check the status of the provided certificate/s. It also executes a metasearch engine or web crawler to search different instances of the signed software file in the web. When one of these instances is located, a signature verification procedure is executed over this file. If there is any anomaly related with the digital certificate, the second server raises an alert to inform the software distributor that a potential problem exists in relation with the digital certificate. The second server would force the revocation of the suspected digital certificate in case being a compromised digital certificate.

In this case, once the status of the digital certificate has changed and has come to be revoked, the second server immediately changes the status of the signed software file and notifies said at least one user, that the acquired signed software file is not trustworthy. In any case, if the software distributor decides that a certificate has been compromised, s/he can go to the second server and directly revoke the digital certificate.

So, once the hashstamp of a signed software file has been generated, said user, as a characteristic of the present invention, can verify if its acquired copy matches with the hash-stamped signed software file registered with the second server. To do so, the user will check validity of the digital signature of the acquired copy of the signed software file and will extract, by using a dedicated program, signature data from the acquired copy of the signed software file. Then the user will request a hashstamp validation to the second server. When the second server receives this request it can check if this digital certificate has been recorded in the system, retrieve a hashed digest and use this hash digest as an index. Following, it can return all the information stored during the creation of the hashstamp. This information will allow the second server to verify the trust certificate chain and determine the certificate status in comparison with the certificate stored during the digital certificate registration.

Even more, the user can verify if the expected software distributor actually was which signed the software file and when it signed the software file. In this case, the usual checks in order to validate the digital signature are done by the second server, which will extract signature data from the acquired copy of the signed software file and will check that corresponds to the software distributor. Then the second server will retrieve a hashed digest and it will use it as an index for searching hashstamp information concerning the acquired copy. This information will allow the second server to verify the trust certificate chain and determine the certificate status in comparison with the certificate stored during the certificate registration.

Complementary of said digital certificate revocation, the method also envisages a procedure to detect not allowed relation between software file hashes and digital certificates. This procedure is executed by the second server which intercepts all the requests done by the users who acquired a copy of the signed software file. In case a request inquires about a software file correctly signed with a digital certificate, and the digital certificate is recorded by the second server but does not exists the corresponding association certificate-file hash, the second server issues a warning to the software distributor and quarantines the other software files signed using that digital certificate.

According to a second aspect there is provided a computer system to prevent security problems in the use of digital certificates in code signing, comprising: a first server used by a software distributor configured for signing at least one software file using a digital certificate with a digital signature of said software distributor; and at least one user computing device of a user for acquiring a copy of said at least one signed software file. On contrary of the known proposals, the system of the second aspect further includes a second server in communication with said first server configured for recording said digital certificate to be used for said signing including information obtained from a trust certificate chain and comprising means for authenticating and registering the software distributor therein and means for generating a hashstamp, upon a request made by the software distributor, of the at least one signed software file.

According to an embodiment, the system further comprising means for using information provided from remote sources including at least one of a Certification Authority (CA) or an Online Certificate Status Protocol (OCSP) and/or means for executing a metasearch engine in a web.

The subject matter described herein can be implemented in software in combination with hardware and/or firmware, or a suitable combination of them. For example, the subject matter described herein can be implemented in software executed by a processor.

According to a third aspect there is provided a computer program product comprising computer program code means adapted to perform the steps according to the method of claim 1 when said program is run on a computer, a digital signal processor, a field-programmable gate array, an application-specific integrated circuit, a micro-processor, a micro-controller, or any other form of programmable hardware. The computer program code may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The computer system and the computer program product implements the method of the first aspect.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
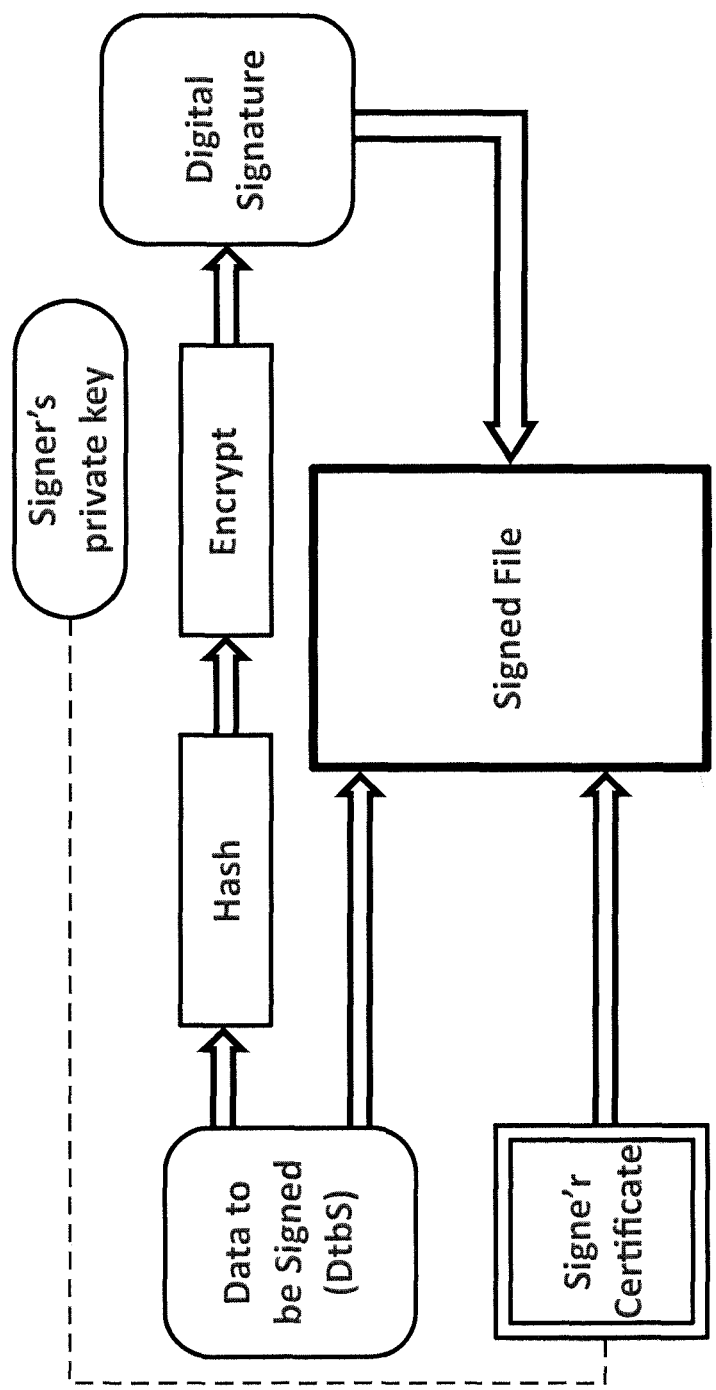
FIG. 1 illustrates a general file signing process.
Figure 2:
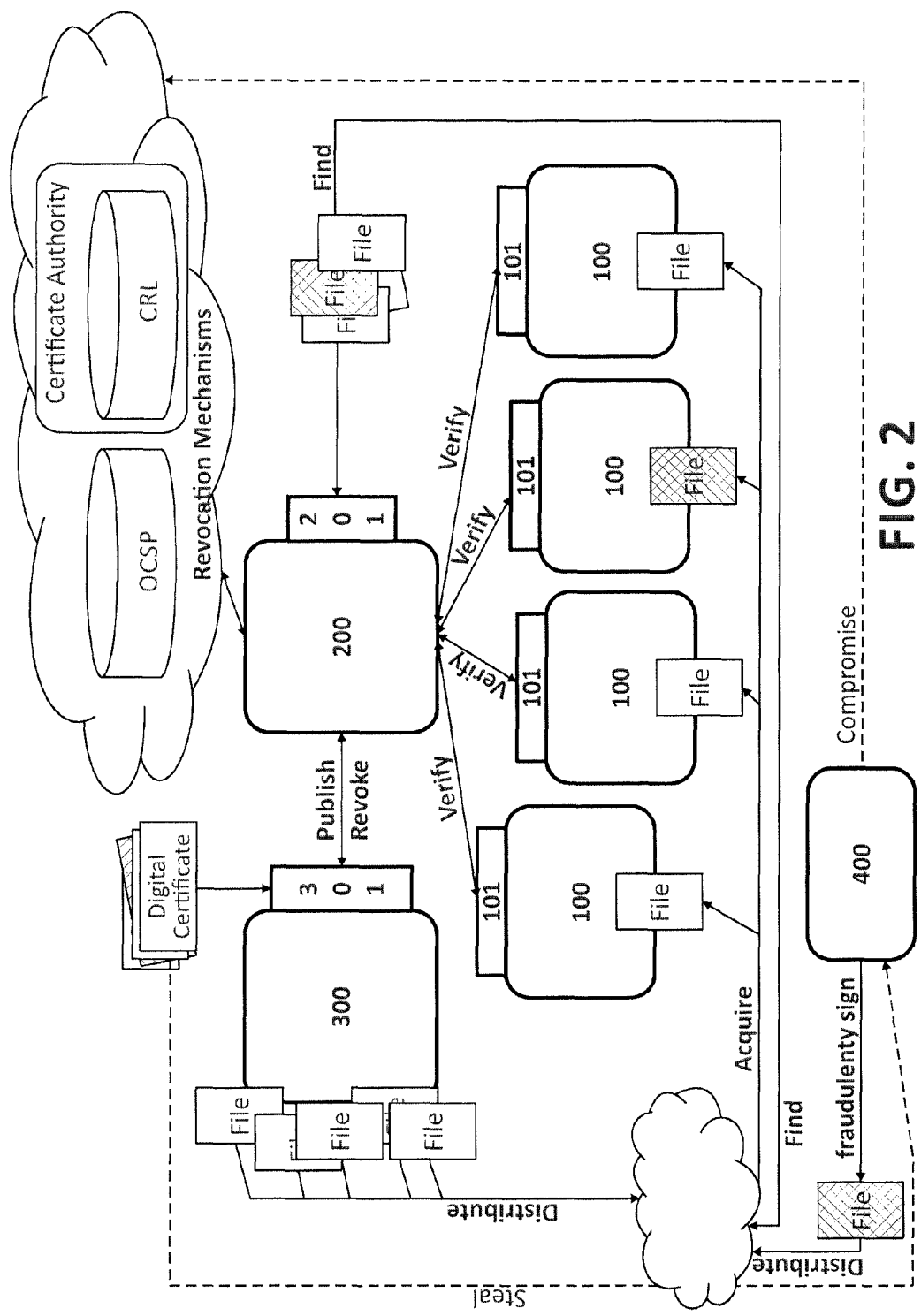
FIG. 2 illustrates the general architecture of the present invention.

The present invention provides an alternative to the way in which traditionally is performed the verification of the digitally signed files published by a distributor of software 300 to end users 100. Nowadays, as can be seen in FIG. 2, an attacker 400 could have the control of a digital certificate issued to a software distributor 300 and this attacker 400 could use the stolen digital certificate to sign software files as if it belonged to 300. The attacker 400 could also compromise to an intermediate certificate authority so that it is possible to introduce a new intermediate certificate authority that can issue certificates in the name of the software distributor 300. Therefore, the present invention proposes the use of a second server 200 that can maintain the information of the signed files recorded/registered by different software distributors.

Once a software distributor 300 has been registered in the second server 200 in order to make use of its services, it is possible to record the digital certificates that are going to be used to sign the software files. Preferably, the second server 200 in order to allow the recording/registering of the digital certificates firstly verifies that the certificate owner 300 is in possession of the digital certificate and that is able to perform the file signing process. This procedure validates the data included in the digital certificate (domain, electronic address or email, etc.) in case an attacker 400 could have compromised the software distributor's web and email infrastructure and the customer's PKI to impersonate a legitimate software distributor 300.

In addition, several verifications may be further done in order to certify the relation of a new digital certificate with an existent software distributor 300 account. This duty is performed with the introduction of a second factor of authentication process, so before a new digital certificate is recorded in the second server 200, different proofs are done to validate the truthful of the digital certificate.

Moreover, a trust certificate chain and the revocation and expiration status of the digital certificate to be recorded can be checked. Consequently, if there is any anomaly an alert system in the second server 200 raises a notification to the software distributor 300. Specifically, once the trust certificate chain is obtained for the particular certificate, the relation between all the intermediate certification authorities is analyzed by means of irregularities search.

In order to accomplish with the goals described in previous sections, several embodiments are presented. The first embodiment corresponds to the basic procedure that allows the software distributor 300 to publish a digital certificate with the second server 200. This procedure associates this digital certificate with the software distributor's account and allows the software distributor 300 to request the registration of signed files demanding the hashstamp creation. The rest of embodiments introduced describe how the advanced goals are achieved by the present invention.

Figure 3:
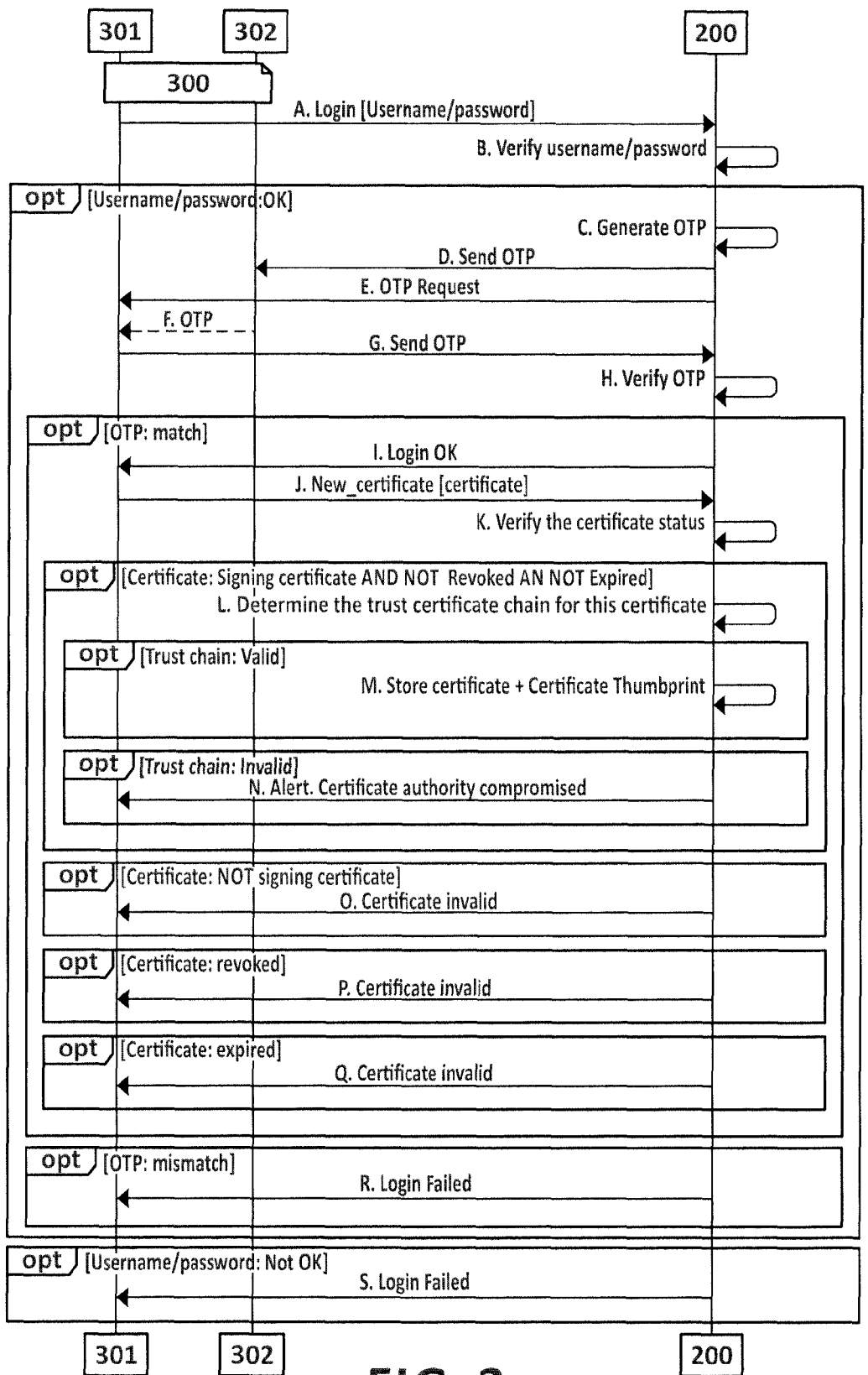
FIG. 3 is a flow diagram illustrating how a new certificate is recorded in the second server according to the present invention.

In reference to FIG. 3, it is showed a process that can be followed to effectuate the registration of the digital certificates employed by the first server 300 (or software distributor as the software files are signed by the software distributor through said first server) to digitally sign their files. In FIG. 3, once the software distributor 300 has requested to be logged in by the second server (A) the second server 200 has to verify the username and the password received (B). The second server 200 may also start an exchange of a second factor of authentication. First, the second server 200 generates a token that it is going to be used as one time password (OTP) (C) and then send this OTP to the software distributor 300 using a different channel that used to normally. In this invention is proposed the usage of several channels (SMS, email, etc.) to be used by software distributor 300 to receive this OTP 302. Once it is received, the software distributor 300 enters the OTP in the interface 301 and sends it (G) to the second server 200. The second server checks if the OTP matches with the one previously generated. If the matching process returns positive results, the second server 200 confirms the login to the software distributor 300 (I). Then, the software distributor 300 using a web browser 301 requests the adscription of a new digital certificate sending the certificate itself within the request (J). Once the digital certificate has been received, the second server 200 performs an exhaustive analysis of the digital certificate (K), verifying if it is a digital certificate issued to be used in code signing processes and checking if its more recently updated status is set as revoked or as expired. The procedures defined to perform these analyses take advantage from the usual techniques proposed for these tasks. If the digital certificate received is a signing certificate valid, the second server 200 determines what trust chain allows to certify he issuer certificate authority as valid (L). On the other hand, this chain is considered as valid if there is not any anomaly between the certificate authorities that participate in the chain. Once the complete relation of certificate authorities needed to reach the root authority has been set, the second server pins it in order to create a certificate thumbprint. Then second server 200 stores this certificate thumbprint in addition of the new digital certificate, both of them in relationship with the user account (M).

If any anomaly was detected when the trust certificate chain had been analyzed, the second server 200 raises an alert to notify to the software distributor 300 that it is likely to have existed a compromised certificate authority when the certificate was issued.

Once a software distributor 300 has at least one digital certificate registered with second server 200, it can begin to registry the information related with the signature of its software files (binaries or document files). This information will be referred as hashstamp. In reference to FIG. 4, once a software distributor 300 has been correctly authenticated (A and B1) by the second server 200, the latter must verify that the software file selected to be registered using the second server 200 is the expected software file and that it has been signed using a previously registered digital certificate (C). Then, according to a first alternative, using a software distributor's dedicated program, 300 can extract the signature contents from the signed software file (D). The standard usually employed to store these signature contents is called PKCS and maintains, in one data structure, all the information needed to verify the digital signature of a software file (digital certificate used, hashed digested, etc.). The software distributor 300 sends this PKCS along with the software file name to request the hashstamp generation for the software file analysed (E). Once the second server 200 receives this request, it extracts the software distributor's certificate from data in the request and it verifies if it is previously related with the software distributor 300 which has been authenticated (F). When the second server 200 verifies that the PKCS corresponds to a legitimated client, it retrieves the trust certificate chain pre-fixed for the particular digital certificate (G) and it obtains the trust chain that can be fixed at the moment the request is being assessed. The second server 200 then verifies if exists any difference that can alert about the possibility of an illegal substitution of a certificate authority. If everything is correct, the second server 200 then stores the request contents (I) and generates the hashstamp including the hashed digest of the software file, the digital certificate used in the digital signature and a timestamp generated by the second server 200 (J). In fact, this hashed digest is used to index the hashstamp generated in the system.

Figure 4:
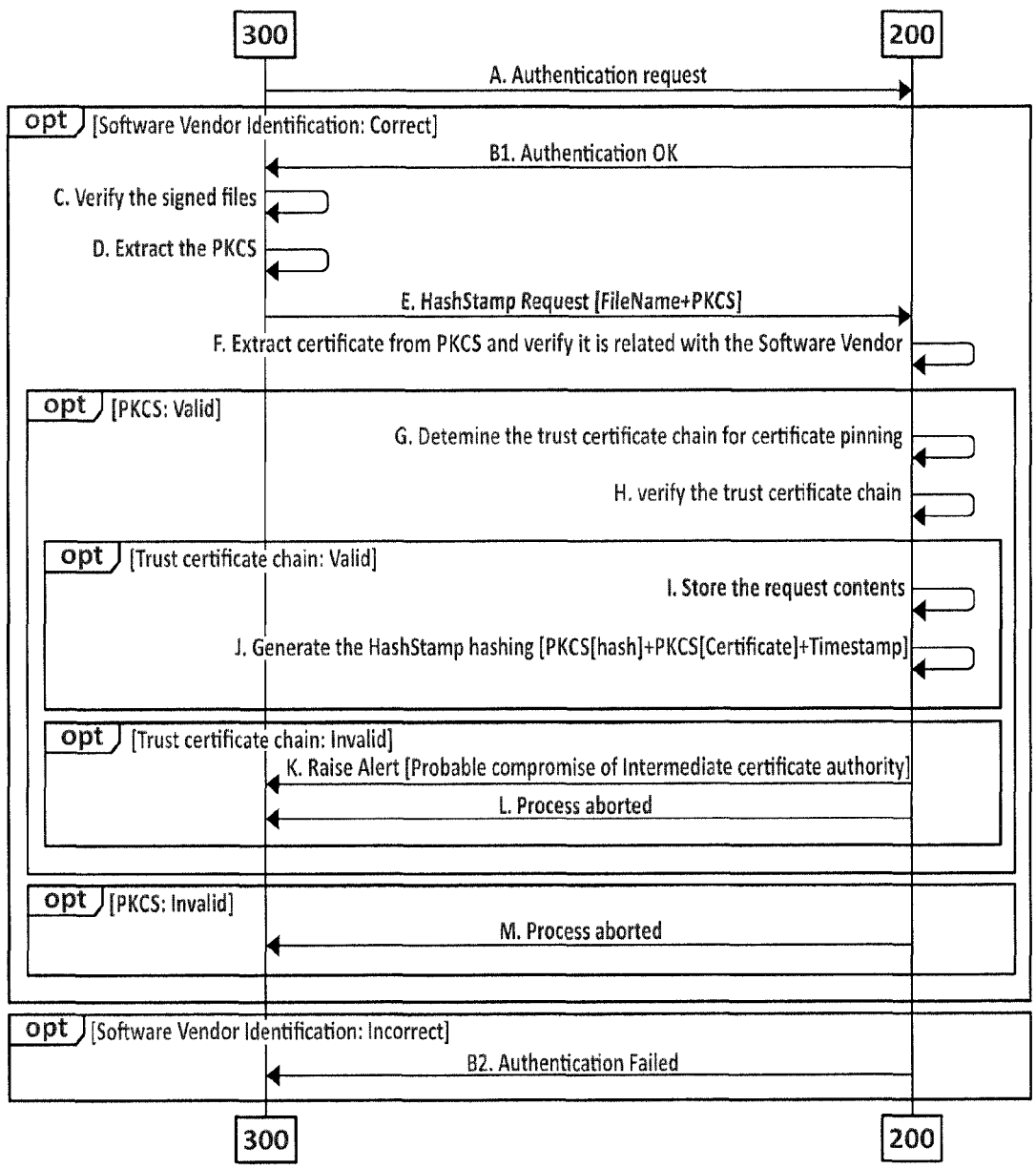
FIG. 4 is a flow diagram illustrating how a hashstamp is generated according to a first alternative of the present invention.
Figure 5:
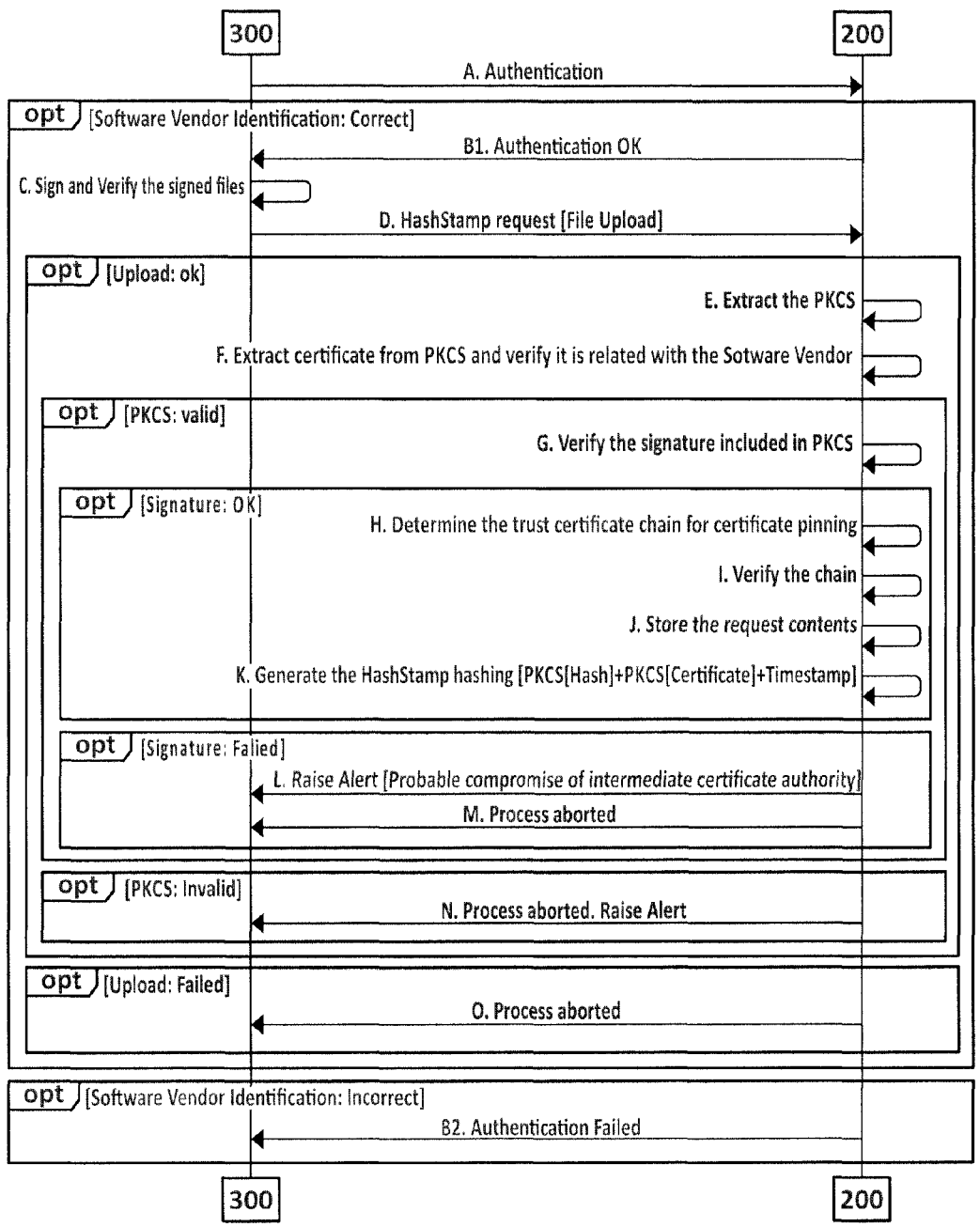
FIG. 5 is a flow diagram illustrating how a hashstamp is generated according to a second alternative of the present invention.

In reference to FIG. 5 a second alternative is presented to resolve the same process. The main difference between this new embodiment and the one described in FIG. 4 is that now, once the software distributor 300 has been authenticated (A and B1), the software distributor 300 digitally signs the software file and uploads it to the second server 200 (D). In this case, it is the second server 200 which is in charge of extract the PKCS from the software file. Then the second server 200 extracts the software distributor's certificate from data in the PKCS (E) and it verifies if it is previously related with the software distributor 300 which has been authenticated (F). When the second server 200 verifies that the information contained in the PKCS corresponds to a legitimated client, it verifies the correctness of the digital signature (G) and it obtains the trust chain that can be fixed at the moment the request is being assessed (H). The second server 200 then verifies if exists any difference between this trust chain and the trust certificate chain pre-fixed for the particular digital certificate (I), if it exists the system can alert about the possibility of an illegal substitution of a certificate authority. If everything is correct, the second server 200 then stores the request contents (J) and generates the hashstamp including the hashed digest of the file, the digital certificate used in the digital signature and a timestamp generated by the second server (K). Again, this hashed digest is used to index the hashstamp generated in the system.

Once the hashstamp of a signed software file has been generated, final users 100 can verify if their acquired copies of the file match with the software file registered with the second server 200. Even, final users can verify if the expected software distributor 300 actually was who signed the software file and when it signed the software file.

Figure 6:
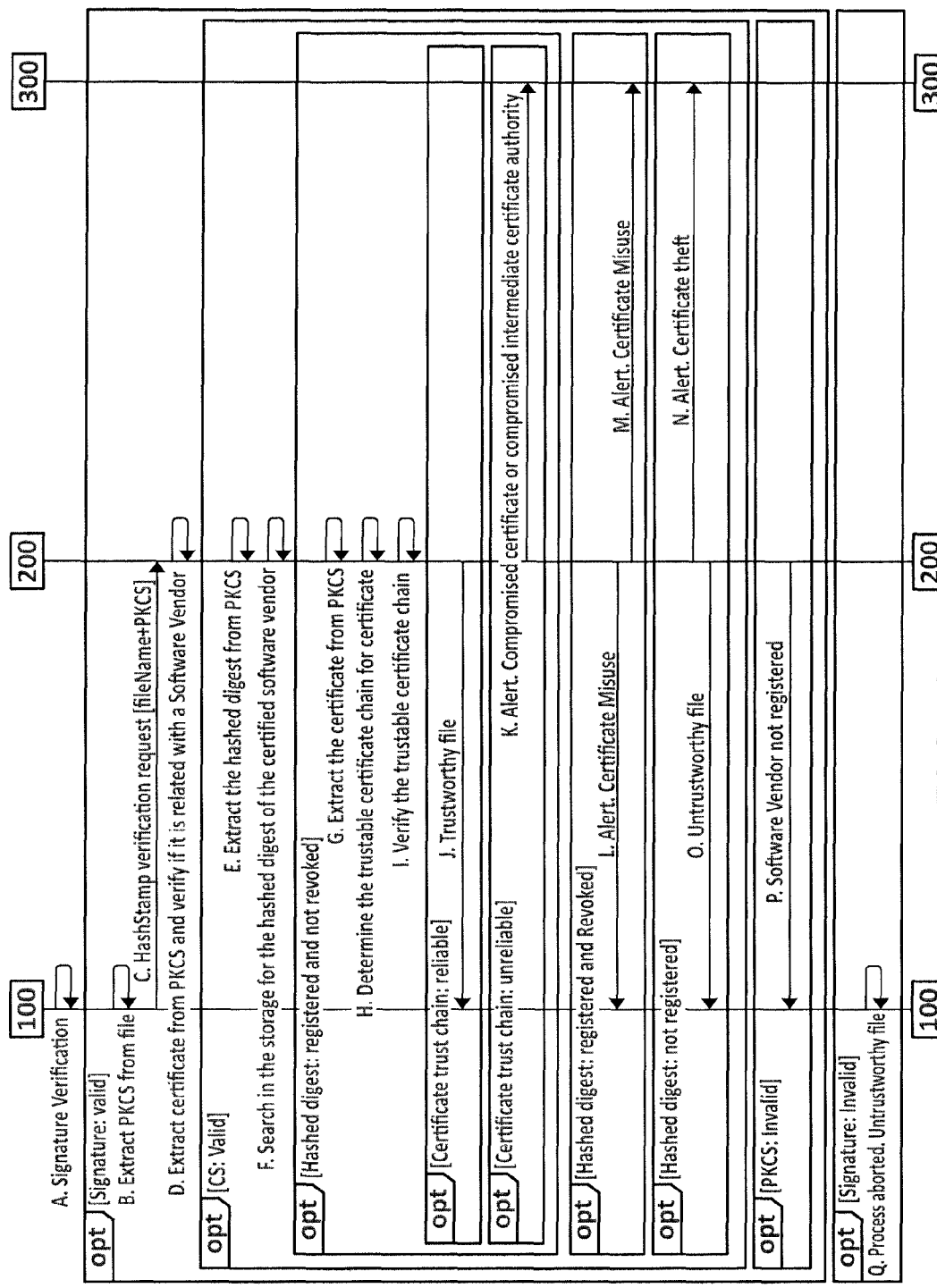
FIG. 6 is a flow diagram illustrating how a user can verify a signed software file status.

In reference to FIG. 6, it is presented an embodiment that explains how a user 100 can verify the signed software file status. Once the user 100 has performed the usual checks in order to validate the digital signature (A), a user's dedicated program can be used to extract the PKCS from the software file (B) and send a hashstamp validation request to the second server 200 (C). When the second server 200 receives this request it can extract the digital certificate from the PKCS in the request (D). If this digital certificate has been registered in the system, the second server 200 can retrieve the hashed digest from the PKCS too (E). Using this hash as index, it can return all the information stored during the generation of the hashstamp (F). This information allows the second server 200 to verify the trust certificate chain (G, H and I) and determine the certificate status in comparison with the certificate stored during the digital certificate registration (J).

Figure 7:
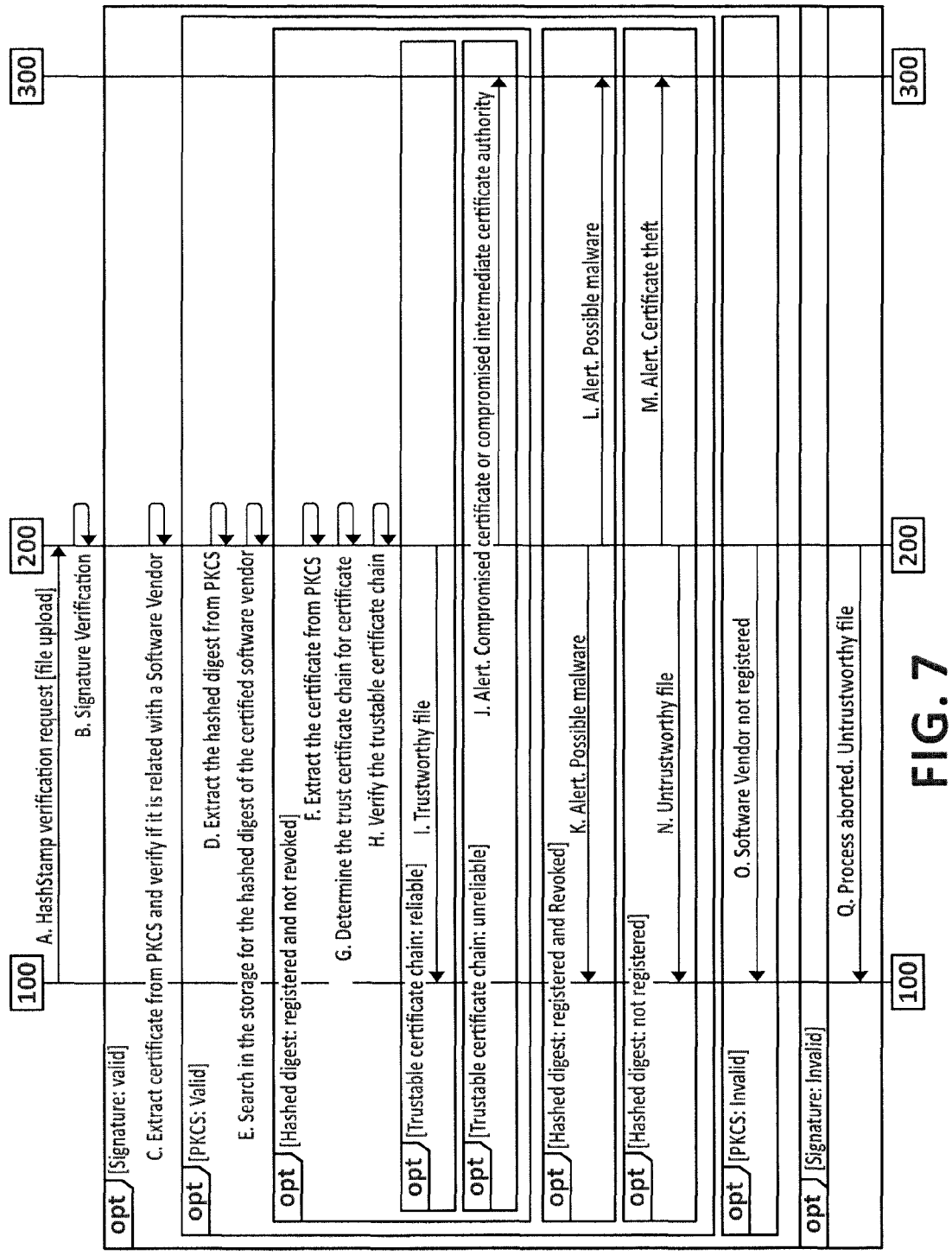
FIG. 7 is a flow diagram illustrating how a user can verify if the expected software distributor actually was which signed the software file and when it signed the software file.

In reference to FIG. 7, other embodiment is described to let the users 100 to verify their acquired files uploading the entire signed software file. In this case the first step performed by the user 100 is to upload the signed software file to the second server 200 (A). Once the signed software file is received, the second server 200 executes the usual checks in order to verify the correctness of the file signature (B). From this point, the second server 200 extracts the certificate from the PKCS to check if it corresponds to a valid software distributor 300 (C). It extracts the hashed digest to perform an indexed search of the information related with the analyzed software file (D and E). Extracting this digital certificate (F), the second server 200 obtains the trust certificate chain (G) and compares it with the trust certificate chain stored during said digital certificate registration (H) to decide if the software file is in fact a trustworthy file.

According to yet another embodiment, the second server 200 can exploit the information provided by various remote official sources such as a Certification Authority (CA) or an Online Certificate Status Protocol (OCSP) to check the status of the digital certificate. It can also execute a web crawler to search different instances of the signed software file in the web. Consequently, if one of these instances is located, a signature verification procedure is executed over this file. The second server 200 will inform the software distributor 300 and will force the revocation of the suspected digital certificate in case being a compromised digital certificate. The second server 200 will also inform the users 100 who request information related to these software files that the software files are not trustworthy.

The scope of the present invention is defined in the following set of claims.

The invention claimed is:

1. A computer implemented method to promptly detect digital certificate misuse, the method comprising:
   signing, by a software distributor via a first server, at least one software file using a digital certificate with a digital signature identifying said software distributor; and
   acquiring, by at least one user via a computing device, a copy of said at least one signed software file,
   wherein said digital certificate to be used for said signing is previously recorded in a second server in communication with said first server, the digital certificate to be recorded being provided by the software distributor upon a registration of the software distributer in said second server and the digital certificate including information obtained from a trust certificate chain associated to the digital certificate when performing said registration,
   wherein the second server, upon a request made by the software distributor, generates a hashstamp of the at least one signed software file,
   wherein said registration comprises checking, by the second server, data included in the provided digital certificate including at least a domain and/or an electronic address, and;
   performing, by the second server, a second authentication of said digital certificate by performing the following steps:
      generating a one-time password (OTP);
      sending said generated OTP to the software distributor through a communication channel including at least a text message, an electronic message or an instant message; and
      certifying, upon receiving said OTP from the software distributor, that the received OTP matches with said generated OTP.

2. The method of claim 1, wherein said hashstamp is generated upon receiving from the software distributor:
   the digital signature of the signed software file along with a name of the signed software file, the digital signature being extracted from the signed software file by means of a dedicated program of the software distributor; or
   a direct upload of the signed software file, the second server extracting the digital signature from the uploaded file and further verifying the digital signature.

3. The method of claim 1, wherein said hashstamp includes information about the software distributor and about the signed software file and a time record certifying a time at which the signing of the software file is reported to the software distributor.

4. The method of claim 1, further comprising:
   checking revocation and expiration status of the provided digital certificate; and
   in response to said revocation and expiration status being checked being valid, certifying the correctness of said trust certificate chain.

5. The method of claim 1, wherein the second server periodically checks a status of the recorded digital certificate by using information provided from remote sources including at least one of a Certification Authority (CA) or an Online Certificate Status Protocol (OCSP).

6. The method of claim 5, wherein the second server further searches by executing a metasearch engine for a plurality of different instances of the signed software file in a web.

7. The method of claim 5, wherein, in response to an anomaly being found concerning an invalid status of the recorded digital certificate and/or an instance in said web being found, the second server at least informs the software distributor about said found anomaly, and the software distributor revokes the recorded digital certificate from the second server in case the recorded digital certificate is compromised.

8. The method of claim 7, wherein the second server further informs said at least one user about said found anomaly.

9. The method of claim 1, further comprising verifying, by said at least one user, that said acquired copy of the signed software file matches said hash-stamped signed software file by:
   checking, by the at least one user, validity of the digital signature of the acquired copy of the signed software file;
   extracting, by the at least one user by using a dedicated program, signature data from the acquired copy of the signed software file and requesting a hashstamp validation to the second server; and
   retrieving, by the second server, a hashed digest using the latter as an index and returning to the at least one user information regarding said hashstamp.

10. The method of claim 1, further comprising proving, by said at least one user, the authorship and time of said signing by performing the second server following steps:
   checking, upon receiving the acquired copy of the signed software file from the at least one use, validity of the digital signature of said acquired copy;
   extracting signature data from the acquired copy of the signed software file and checking that the extracted signature data corresponds to the software distributor;
   retrieving a hashed digest and using the hashed digest as an index for searching hashstamp information concerning the acquired copy; and
   comparing an obtained trust certificate chain of the acquired copy with a trust certificate chain of the registered signed software file.

11. A computer system to promptly detect digital certificate misuse, the computer system comprising:
   a first server used by a software distributor configured to sign at least one software file using a digital certificate with a digital signature of said software distributor;
   at least one user computing device of a user configured to acquire a copy of said at least one signed software file;
   a second server in communication with said first server configured to record said digital certificate to be used for said signing including information obtained from a trust certificate chain and authenticate and register the software distributor therein and generate a hashstamp, upon a request made by the software distributor, of the at least one signed software file,
   wherein said registration comprises checking, by the second server, data included in the provided digital certificate including at least a domain and/or an electronic address, and;
   wherein the system is further configured to perform, by the second server, a second authentication of said digital certificate by performing the following steps:
      generate a one-time password (OTP);
      send said generated OTP to the software distributor through a communication channel including at least a text message, an electronic message or an instant message; and certify, upon receiving said OTP from the software distributor, that the received OTP matches with said generated OTP.

12. The system of claim 11, wherein the system is further configured to use information provided from remote sources including at least one of a Certification Authority (CA) or an Online Certificate Status Protocol (OCSP) and/or execute a metasearch engine in a web.

13. A non-transitory computer readable medium storing a program causing a computer to execute a method to promptly detect digital certificate misuse, the method comprising:

signing, by a software distributor via a first server, at least one software file using a digital certificate with a digital signature identifying said software distributor; and acquiring, by at least one user via a computing device, a copy of said at least one signed software file, wherein said digital certificate to be used for said signing is previously recorded in a second server in communication with said first server, the digital certificate to be recorded being provided by the software distributor upon a registration of the software distributer in said second server and the digital certificate including information obtained from a trust certificate chain associated to the digital certificate when performing said registration, wherein the second server, upon a request made by the software distributor, generates a hashstamp of the at least one signed software file, and wherein said registration comprises checking, by the second server, data included in the provided digital certificate including at least a domain and/or an electronic address, and;

performing, by the second server, a second authentication of said digital certificate by performing the following steps:

generating a one-time password (OTP);

sending said generated OTP to the software distributor through a communication channel including at least a text message, an electronic message or an instant message; and certifying, upon receiving said OTP from the software distributor, that the received OTP matches with said generated OTP.

\* \* \* \* \*